United States Patent

[11] 3,601,173

| [72] | Inventor | Richard Edgar Anderson<br>365 Arch St., New Britain, Conn. 06051 |
|---|---|---|
| [21] | Appl. No. | 840,716 |
| [22] | Filed | July 10, 1969 |
| [45] | Patented | Aug. 24, 1971 |

[54] AUTOMATIC ANTISKID DEVICE
12 Claims, 6 Drawing Figs.

| [52] | U.S. Cl. | 152/214 |
|---|---|---|
| [51] | Int. Cl. | B60c 27/14 |
| [50] | Field of Search | 152/214 |

[56] References Cited
UNITED STATES PATENTS

| 1,939,771 | 12/1933 | Erwin | 152/214 |
|---|---|---|---|
| 2,838,086 | 6/1958 | Feeney | 152/214 |

*Primary Examiner*—James B. Marbert
*Attorney*—McCormick, Paulding & Huber

ABSTRACT: An antiskid device for a wheel of a motor vehicle or the like having a plurality of antiskid elements and means for retaining the elements in an inactive or storage position and for moving the elements between said inactive and an active or operative position wherein the elements engage the peripheral surface of the wheel for rotation therewith. The antiskid elements are connected to the retaining and moving means for rotation relative thereto in said active position and are movable into and out of operative engagement with the wheel without jacking the vehicle or otherwise raising the wheel above ground level.

PATENTED AUG 24 1971 3,601,173
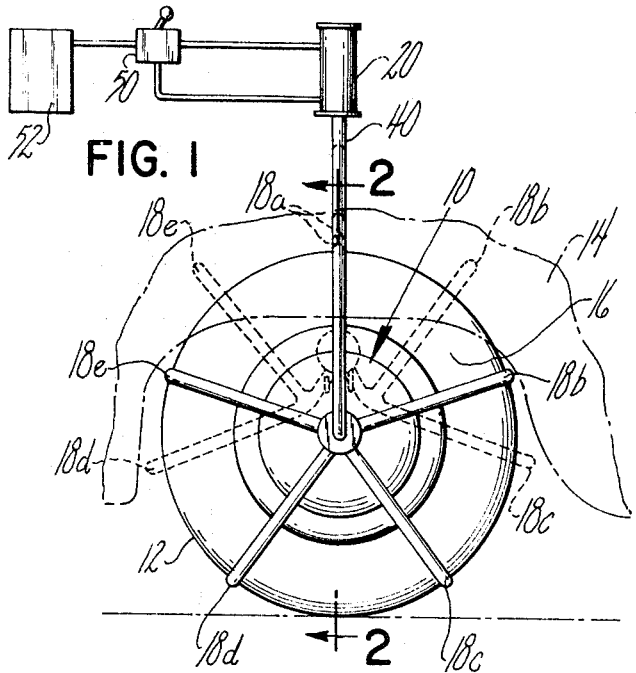
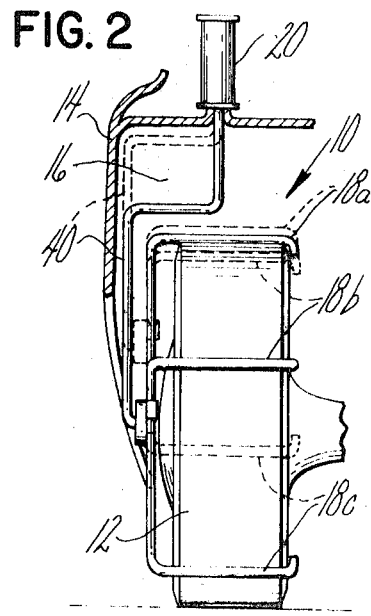
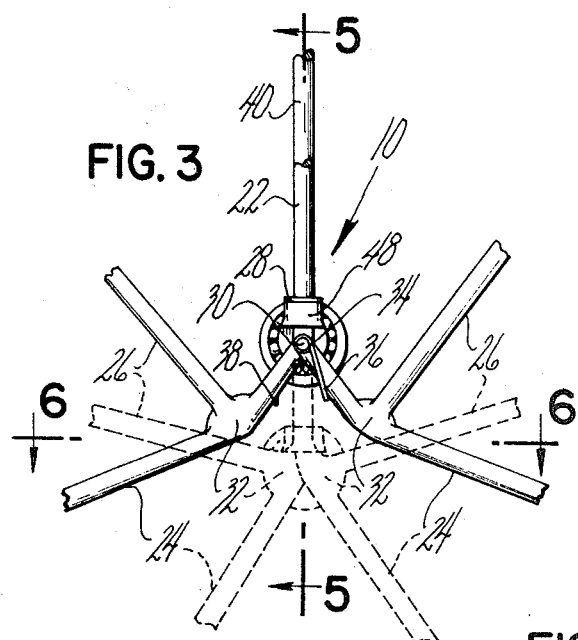
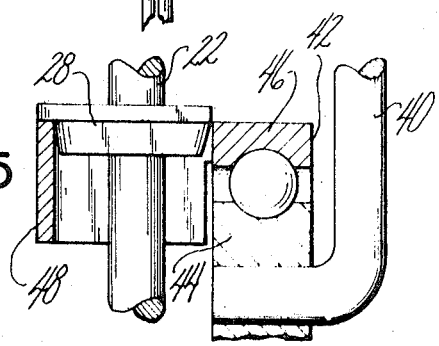
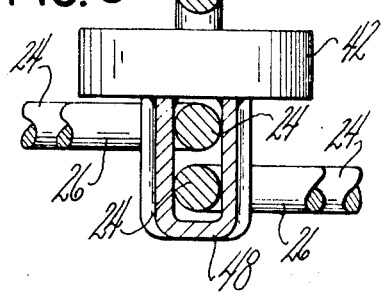
INVENTOR.
RICHARD E. ANDERSON
BY
McCormick, Paulding & Huber
ATTORNEYS

3,601,173

AUTOMATIC ANTISKID DEVICE

BACKGROUND OF THE INVENTION

This invention relates to an antiskid device for a wheel of a motor vehicle or the like and deals more particularly with a device of the type which is installed on or removed from an associated vehicle wheel without the necessity of raising the wheel off of the ground.

The general aim of the present invention is to provide a device of the aforedescribed character for automatic installation on and removal from an associated vehicle wheel without bothersome manual operations. A further aim of the invention is to provide a device for storage in a vehicle and in an inactive ready position near an associated wheel and which may be promptly moved to an active position in operative engagement with the wheel as road conditions require. A still further aim of the invention is to provide a device of the character described which is highly efficient, reliable in use and of simple durable construction for low-cost manufacture and installation.

SUMMARY OF THE INVENTION

In accordance with the present invention, an automatic antiskid device is provided which includes a plurality of antiskid elements and means for retaining the elements in an inactive position wherein they are spaced generally radially outwardly from the peripheral surface of an associated wheel and for moving the elements between said inactive position and an active position. In the active position, the elements engage said peripheral surface in circumaxially spaced relation to each other and rotate with the wheel and relative to the retaining and moving means which remains connected thereto.

BRIEF DESCRIPTION OF THE DRAWINGS

FIG. 1 is a side elevational view of a device embodying the present invention and shows the device in an active position relative to a rear wheel of a motor vehicle, an inactive position of the device being indicated by broken lines.

FIG. 2 is a rear elevation view of the device of FIG. 1, a fragmentary portion of the body of the vehicle being shown in section taken along the line 2—2 of FIG. 1.

FIG. 3 is a somewhat enlarged fragmentary side elevational view of the device of FIG. 1 and shows the device in its inactive position, the active position being indicated by broken lines.

FIG. 4 is a somewhat enlarged fragmentary rear elevational view of the device as it appears in FIG. 3.

FIG. 5 is a fragmentary sectional view taken along the line 5—5 of FIG. 3 and shows the device in its active position.

FIG. 6 is a fragmentary sectional view taken along the line 6—6 of FIG. 3 and shows the device in its active position.

DETAILED DESCRIPTION OF THE PREFERRED EMBODIMENT

Turning now to the drawing and referring particularly to FIGS. 1 and 2, a device embodying the present invention and indicated generally at 10 is illustrated with reference to a motor vehicle rear wheel 12. A rear fender of the motor vehicle and a portion of its associated wheel well are respectively indicated at 14 and 16. The device 10 generally comprises a plurality of antiskid elements 18a, 18b, 18c, 18d and 18e supported for movement relative to the wheel 12 between an active or full-line position and an inactive or storage position indicated by broken lines. In the active position, the antiskid elements 18a–18e engage the peripheral surface of the wheel 12 in circumaxially spaced relation to each other and rotate with the wheel to impart desired antiskid quality thereto. When the device is in its inactive position, the elements 18a–18e are retained in stationary position generally within the wheel well 16 and spaced generally radially outwardly from the peripheral surface of the wheel 12 which is free to rotate relative thereto.

Various means may be provided for moving the antiskid elements 18a–18e between the inactive and active positions and for selectively retaining them in either of the latter positions. In the illustrated embodiment 10 a double-acting fluid motor 20 which may, for example, comprise an air or hydraulic cylinder is provided for this purpose. The cylinder 20 is connected to a part of the vehicle and is also connected to the various elements 18a–18e in a manner that will be hereinafter more fully discussed. For convenience of illustration, the connection between the vehicle and the fluid cylinder 20 is shown somewhat schematically, the cylinder being shown mounted on the body of the vehicle and above the wheel well 16. In the illustrated case, no provision is made to compensate for relative movement between the wheel 12 and the body of the vehicle, however, it will be apparent to one skilled in the art that it may be desirable if not necessary, to provide for the aforesaid relative movement, and this may be done, for example, by employing suitable movable connection between the cylinder and the body of the vehicle. If desired, the cylinder 20 may be mounted on another part of the vehicle which moves with the wheel as, for example, the axle housing. In this manner the problem of relative movement may be wholly eliminated.

Considering now in further detail the manner in which the antiskid elements 18a–18e are supported and referring more particularly to FIGS. 3 and 4, the device 10 includes a main or primary support member 22 and a plurality of secondary support members 24, 24 and 26, 26, the support members being equal in number to the number of antiskid elements to be provided. In the illustrated embodiment one primary or main support member and four secondary support member and four secondary support members are employed and cooperate to provide support for five antiskid elements. It should be understood, however, that the device may be constructed to accommodate a greater or lesser number of antiskid elements and such modified forms are contemplated within the scope of the present invention.

The support members may take various forms, but preferably, and as shown, they are made from metal bars or rods. The main support member 22 is disposed in a generally vertical position near the outer side of the wheel 12 and extends radially inwardly with respect to the wheel or toward the center of the wheel. The outer end portion of the support member 22 is bent axially inwardly or toward the inboard side of the wheel and extends transversely of the peripheral surface thereof. The inboard or free end portion of the primary support member 22 is bent radially inwardly near the inner side of the wheel 12. Thus, a portion of the main support member 22 also comprises the antiskid element designated at 18a. The support member 22 also has a flanged collar 28 mounted thereon and spaced from the inner end thereof for a purpose that will be hereinafter described.

The secondary support members 24, 24 are pivotally connected at their respective inner ends to the inner end of the main support member 22 by a pivot pin 30 carried by a support member 22 and extending through pin-receiving apertures in the end portions of the support members 24, 24. The outer end portion of each secondary support member is bent in an axial direction to extend transversely of the peripheral surface of the wheel 12 and has the free end portion thereof bent radially inwardly near the inboard side of the wheel 12 in the manner previously described with reference to the main support member 22. Thus, the outer end portion of one support member 24 forms the antiskid element 18c whereas the outer end portion of the other support member 24 forms the element 18d as shown in FIGS. 1 and 2. It should be noted that when the device is in its active position the antiskid element 18a is in engagement with the peripheral surface of the wheel 12 as it appears in full lines in FIGS. 1 and 2 and the inner end of the main support member 22 and its associated pivot pin 30 are spaced radially outwardly some distance from the center of the wheel 12. Each secondary support member 26 is welded or otherwise suitably secured at its inner end to an associated support member 24 at a junction 32 spaced from the pivot pin 30 and extends outwardly from the latter junction in a generally radial direction, as shown. The outer or free ends of the secondary support members 26, 26 are also bent as previously described and form the antiskid elements 18b and 18e. Due to the spacing of the junctions 32, 32 from the axis of the pivot pin 30 the latter junctions generally coincide with the center of the wheel 12 when the device is moved to its active position. In the latter position, the various support members radiate outwardly from the center of the wheel 10 and are generally equiangularly spaced.

The two secondary support members 24, 24 are biased in opposite directions relative to the pivot pin 30 by a spring 34 which is coiled around the pivot pin 30 and has radially extending legs 36 and 38 each of which respectively engage an associated support member 24 in radially spaced relation to the pivot pin 30. Referring to the device 10 as it appears oriented in FIGS. 1 and 3, the support member 24 to the right of the pivot pin 30 is biased in a counterclockwise direction whereas the support member 24 to the left of the pivot pin is biased in a clockwise direction.

Connection between the fluid cylinder 20 and the various support members is provided by a connecting rod 40 which extends from the cylinder and has the free end portion thereof offset to extend in a generally radial direction near the outboard side of the wheel 12 and toward the center thereof in generally parallel relation with the main support member 22. The inner end of the connecting rod 40 is bent inwardly in an axial direction axially or toward the center of the wheel 12 and carries a bearing 42 which includes an inner part 44 and an outer part 46. The inner part 44 is preferably welded or otherwise suitably secured to the end of the connecting rod 40 whereas the outer part 46 is free to rotate relative thereto. A sleeve 48 welded or otherwise secured to the outer part 46 for rotation therewith surrounds the main support member 22 and complements an associated portion of the collar 28 inwardly of the flange thereof. The latter portion of the collar is received in the sleeve. The collar 28 cooperates with the sleeve 48 to move the device 10 to and retain it in its inactive position when the connecting rod is moved radially outwardly or away from the center of the wheel by the fluid cylinder 20. The sleeve 48 is also adapted to be moved toward the center of the wheel 12 by the connecting rod 40 and with the bearing 42 and to slide over the pivoted inner end portions of the support members 24, 24, the pivot pin 30 and its associated spring 34 to move the various secondary support members to and retain them in active position. For this reason, the right and left lower side edge portions of the sleeve 48 are flared outwardly as the sleeve appears oriented in FIG. 3.

When a road condition is encountered which requires the use of an antiskid device, the device 10 may be readily moved from its inactive to its active position. The vehicle is preferably first brought to rest. The hydraulic cylinder 20 is preferably remotely controlled by the driver of the vehicle from his position in the driver's seat by operation of a suitable control valve indicated schematically at 50. The valve is disposed in the fluid line between the cylinder 20 and a fluid source 52 and controls movement of the double-acting cylinder. Movement of the control valve 50 to one position causes fluid to enter the cylinder 20 which serves to move the connecting rod 40 radially inwardly or toward the center of the wheel and toward its active position. The main support member 22 moves inwardly with the connecting rod until the antiskid element 18a engages the peripheral surface of the wheel 12 to arrest inward movement of the main support member 22. Thereafter, the connecting rod 40 continues its inwardly travel and the sleeve 48 moves away from the collar 28 and into engagement with the inner end portions of the secondary support members 24, 24. The flared side edge portions of the sleeve 48 engage and urge the latter members to pivot inwardly against the biasing force exerted by the spring 34 and toward their active position indicated by broken lines in FIG. 3. When the connecting rod 40 reaches the inner limit of its travel the bearing 42 is coaxially aligned with the wheel 12 and it will be evident that the antiskid elements 18a–18e are free to rotate with the wheel and relative to the connecting rod 40.

Now, when it is desired to remove the antiskid elements from the wheel 12 and place the device in its inactive or storage position, the vehicle is preferably first brought to rest. Since the main brace 22 has rotated with the wheel, it may or may not be vertically aligned with the connecting rod 40, but it will be evident that such alignment must be effected before the device 10 may be moved to its inactive position. The fluid motor 20 is first operated to apply an outwardly directed biasing force on the connecting rod 40. If the connecting rod 40 and the main support member 22 happen to be in parallel alignment the connecting rod will immediately respond and travel toward its inactive position. However, if the main support member and the connecting rod are not in parallel alignment when the vehicle is brought to rest, the device 10 may be moved to its inactive position by applying outwardly directed biasing force to the connecting rod 40 while simultaneously moving the vehicle slowly relative to the ground. When the main brace 22 rotates to a position of parallel alignment with the connecting rod 40 the outwardly directed biasing force exerted upon the sleeve 48 by the connecting rod will cause the sleeve to travel radially outwardly out of engagement with the secondary braces 24 and 24 and toward engagement with the collar 28. As the sleeve 48 moves out of engagement with the secondary support members 24, 24, the latter support members are automatically biased toward their respective inactive positions by the spring 34. The sleeve 48 then engages the collar 28 and carries the main brace radially outwardly with respect to the wheel 12 so that the antiskid element 18a moves out of engagement with the peripheral surface of the wheel. Thus, the entire operation of the device may be accomplished by the operator of the vehicle without leaving the vehicle.

I claim:

1. An antiskid device for a vehicle wheel comprising a plurality of antiskid elements, means for supporting said elements in an active position wherein said elements engage the peripheral surface of the wheel in circumaxially spaced relation to each other for rotation with the wheel and an inactive position wherein said elements are spaced generally radially outwardly from the peripheral surface in substantially fixed position relative to the body of the vehicle and the wheel is free to rotate relative to said elements, and means connected to another part of the vehicle and permanently connected to said supporting means for moving said supporting means between said active and inactive positions and for retaining said supporting means in said active and inactive positions, said supporting means in said active position being rotatable with said wheel and relative to said moving and retaining means connected thereto.

2. An antiskid device for a vehicle wheel as set forth in claim 1 wherein said supporting means comprises a plurality of support members pivotally connected each to the other at their respective inner ends and extending radially outwardly relative to the wheel in said active position, each of said support members carrying an associated one of said antiskid elements.

3. An antiskid device for a vehicle wheel as set forth in claim 2 wherein each of said support members comprises an elongated bar and each of said antiskid elements comprises a portion of an associated said bar.

4. An antiskid device as set forth in claim 1 wherein said moving and retaining means includes a connecting rod movable relative to the other part of the vehicle and to said supporting means and having an end portion movable generally radially toward and away from the center of the wheel when said supporting means is moved between its active and inactive positions respectively and a bearing providing connection between said connecting rod and said supporting means.

5. An antiskid device for a vehicle wheel as set forth in claim 4 wherein said supporting means includes a main support member carrying one of said elements and extending radially inwardly therefrom and at least one secondary support member pivotally connected to said main support member and carrying another of said elements.

6. An antiskid device for a vehicle wheel as set forth in claim 5 wherein said moving and retaining means includes a sleeve carried by said bearing and generally surrounding an associated portion of said main support member in said inactive position, said sleeve being movable into engagement with said one secondary support member to pivot said one secondary support member relative to said main support member to move said other element into and retain said other element in engagement with the peripheral surface of the wheel when said supporting means is moved to said active position by said moving and retaining means.

7. An antiskid device for a vehicle wheel as set forth in claim 6 including a collar mounted on said main support member, said sleeve being engageable with said collar to move said support members to and retain said support members in said inactive position when said supporting means is moved to its inactive position by said moving and retaining means.

8. An antiskid element for a vehicle wheel as set forth in claim 1 wherein said moving means includes a bearing connecting said supporting means and said moving and retaining means, said bearing being coaxially aligned with the wheel in said active position to permit said supporting means to rotate with the wheel and relative to said moving and retaining means.

9. An antiskid element for a vehicle wheel as set forth in claim 8 wherein said bearing has two coaxially rotatable parts one of said bearing parts being connected in fixed position to said moving and retaining means and the other of said bearing parts being connected to said supporting means for rotation therewith and with the wheel in said active position.

10. An antiskid device for a vehicle wheel as set forth in claim 1 wherein said supporting means includes means for automatically moving at least one of said antiskid elements circumaxially and radially outwardly relative to said wheel when said supporting means is moved toward said inactive position.

11. An antiskid device for a vehicle wheel as set forth in claim 10 wherein said means for automatically moving said one antiskid element comprises a spring.

12. An antiskid device as set forth in claim 1 including means for remotely controlling the movement of said moving and retaining means between said active and inactive positions.